United States Patent [19]

Langwieder et al.

[11] 4,449,603
[45] May 22, 1984

[54] SUSPENSION FOR A FRONT, ESPECIALLY A TRANSVERSELY-MOUNTED MOTOR VEHICLE POWER PLANT

[75] Inventors: Rolf Langwieder, Heimsheim; Rolf Rebmann, Kornwestheim; Erich Stotz, Kernen; Franz-Rudolf Wierschem, Kehrig; Fred Trick, Münsingen, all of Fed. Rep. of Germany

[73] Assignee: Dr. Ing. h.c.F. Porsche AG, Fed. Rep. of Germany

[21] Appl. No.: 372,691

[22] Filed: Apr. 28, 1982

[30] Foreign Application Priority Data

May 2, 1981 [DE] Fed. Rep. of Germany ....... 3117378

[51] Int. Cl.³ .............................................. B60K 5/12
[52] U.S. Cl. .................................... 180/232; 180/291; 180/297; 180/312; 248/548; 280/784; 296/189
[58] Field of Search ............... 180/232, 291, 297, 300, 180/312; 280/784; 248/548; 296/189

[56] References Cited

U.S. PATENT DOCUMENTS

| 3,752,247 | 8/1973 | Schwenk | 180/232 |
| 3,834,476 | 9/1974 | Donaldson | 180/232 |
| 3,869,017 | 3/1975 | Feustel et al. | 180/232 |

FOREIGN PATENT DOCUMENTS

| 2,056,102 | 5/1972 | Fed. Rep. of Germany | 180/232 |
| 2,249,555 | 4/1974 | Fed. Rep. of Germany | 180/232 |
| 2,455,790 | 6/1976 | Fed. Rep. of Germany | 180/232 |
| 2,757,421 | 6/1978 | Fed. Rep. of Germany | 180/232 |
| 2,915,632 | 10/1979 | Fed. Rep. of Germany | 180/297 |
| 1489360 | 10/1977 | United Kingdom | 180/232 |

*Primary Examiner*—Joseph F. Peters, Jr.
*Assistant Examiner*—Kenneth R. Rice
*Attorney, Agent, or Firm*—Craig & Burns

[57] ABSTRACT

A power plant is carried by a body on a three-point support. A front mount of three-point is formed by an energy-absorbing longitudinal support which cooperates with another mount of the support which is constructed as a slide bearing to absorb relative motion of the power plant.

22 Claims, 16 Drawing Figures

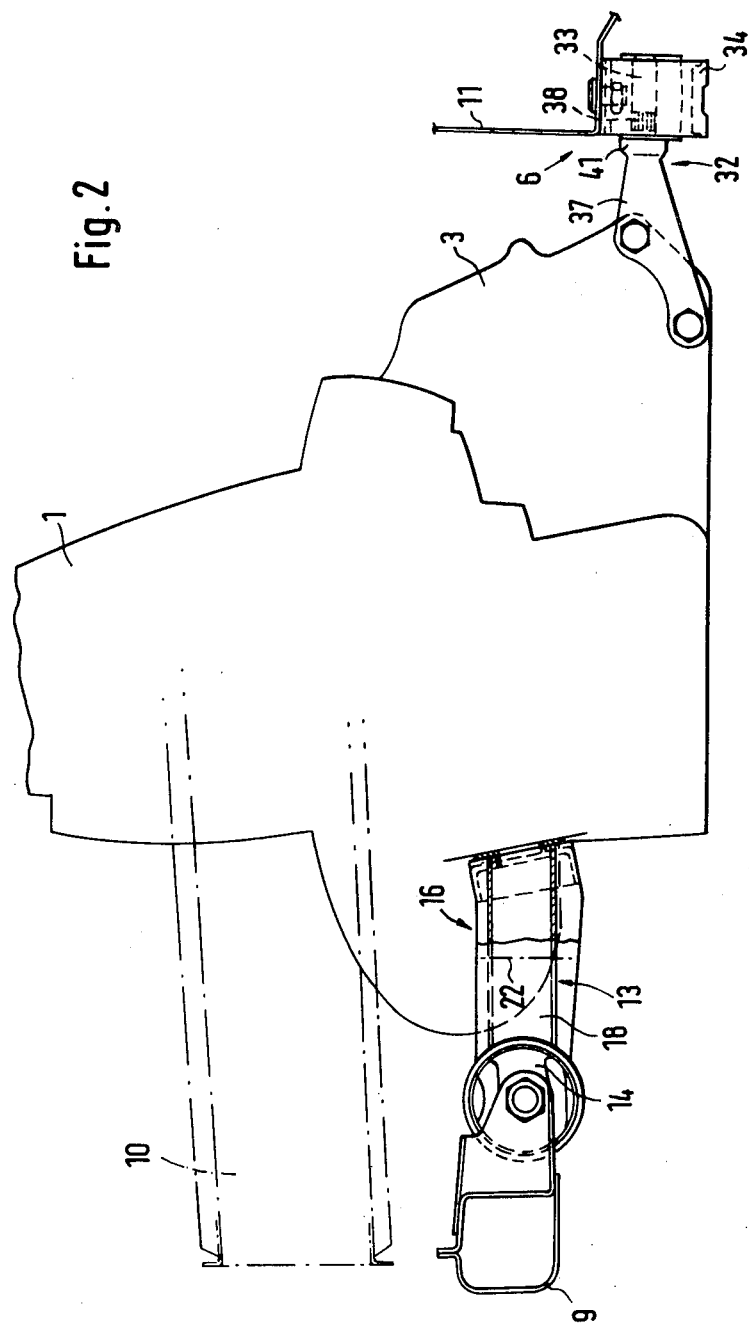

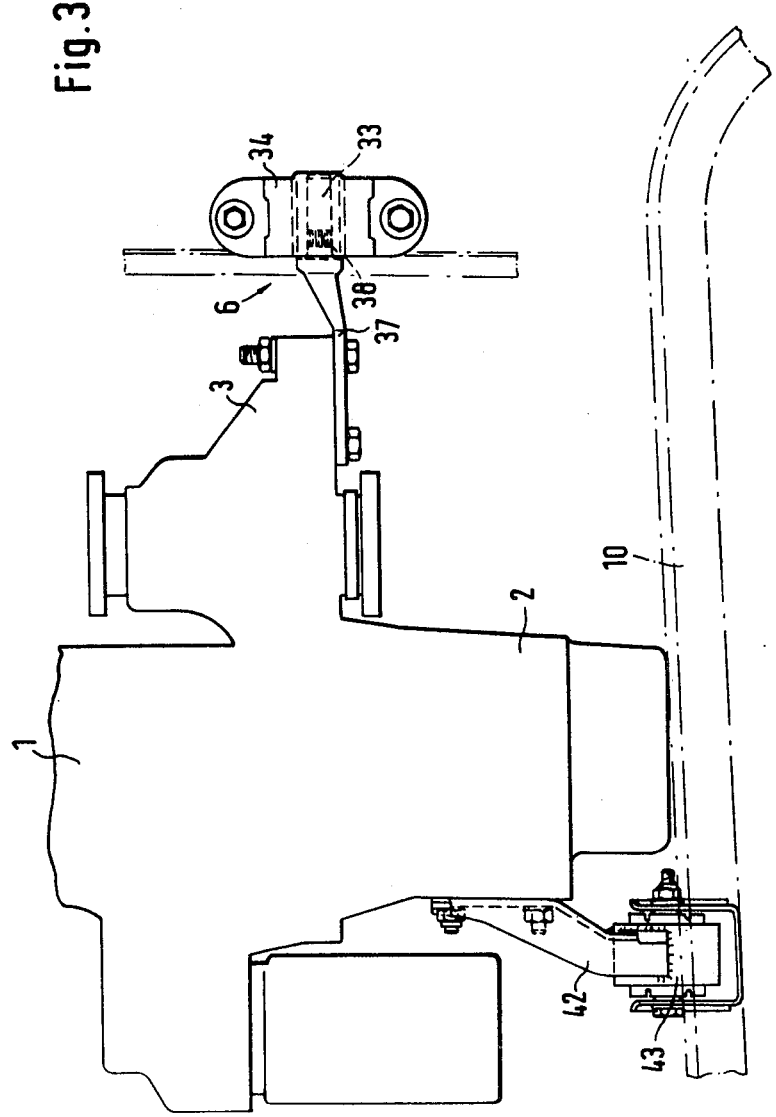

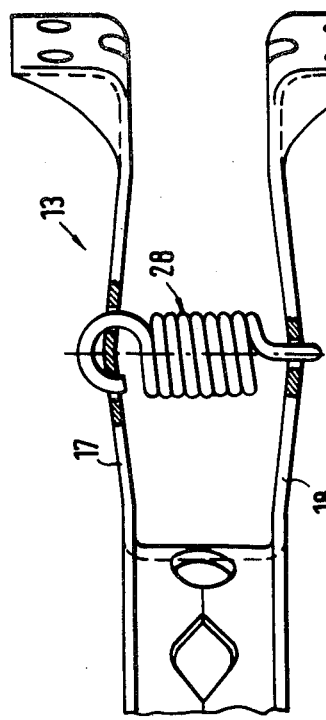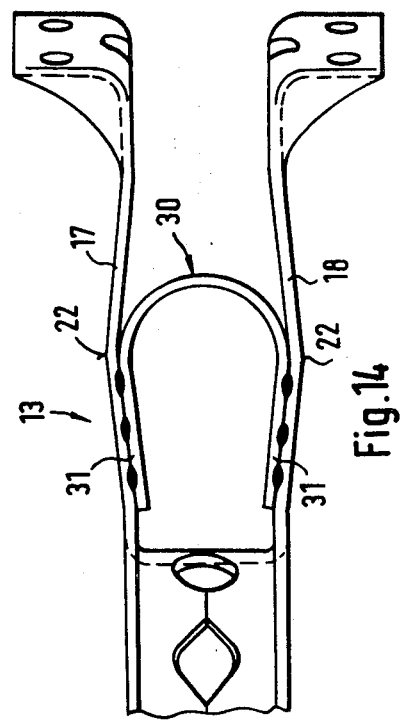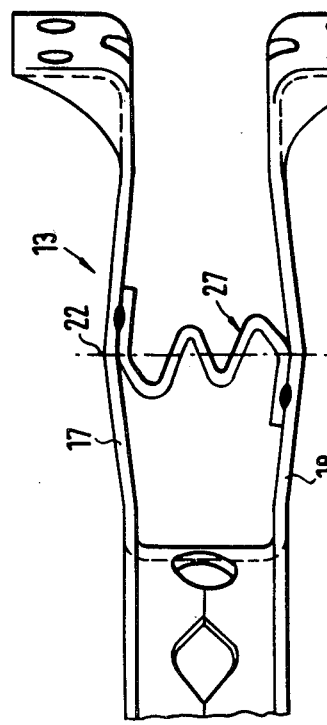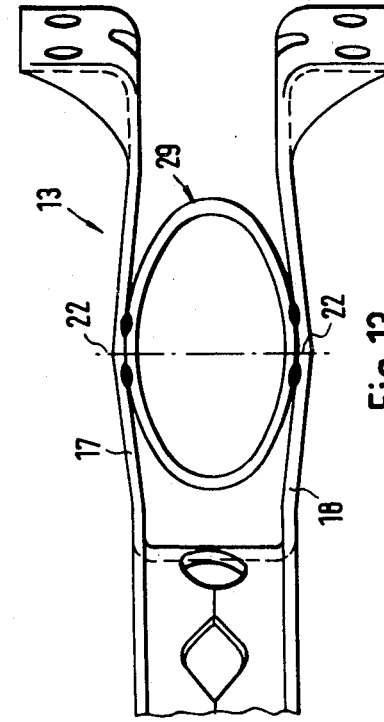

SUSPENSION FOR A FRONT, ESPECIALLY A TRANSVERSELY-MOUNTED MOTOR VEHICLE POWER PLANT

BACKGROUND AND SUMMARY OF THE INVENTION

The invention relates to a suspension for a front, especially a transversely mounted, motor vehicle power plant that is arranged in a frame structure on a mount located forward of the engine and laterally and rearwardly on resilient mounts.

On head-on collision of a vehicle provided with a front engine, at least above a certain speed, the mounts of the vehicle power plant, which may be an engine or engine-transmission unit, are destroyed. To avoid an undesirable impulse transmission from the power plant to the body, these mounts are usually relatively soft. As a result of the destruction of the mounts on impact, the power plant moves toward the vehicle occupant compartment after the vehicle has collided.

German Patent Application (Auslegeschrift) No. 2,455,790 reveals an arrangement for mounting a motor vehicle front power plant on resilient mounts. This arrangement is retained by a bracket which absorbs the deformative action rearward of the plant, at the central tunnel of the body structure. Also known are longitudinal support members constructed as deformation elements of body structures (U.S. Pat. No. 3,869,017), and deformation elements mounted on the front transverse member of a bumper structure (German Patent Application—Offenlegungsschrift—No. 2,757,421). It is also known (German Patent Application—Offenlegungsschrift—No. 2,249,555) to construct a mount arranged rearwardly of the power plant so that it breaks off when a certain critical impact load is exceeded. Then the power plant falls down uncontrolled. Other known suspensions (German Patent Application—Offenlegungsschrift—No. 2,056,102) for power plants are constructed to deflect the plant toward the roadway on collision.

The object of the invention is to supply a vehicle power plant suspension in which a mount provides for the absorption of sufficient deformation and a functionally adapted relative motion of the plant or frame without destruction of the other mounts.

According to preferred embodiments of the invention, this object is achieved with the power plant being carried on the vehicle body by an energy-absorbing front longitudinal support and at least one mount constructed as a slide mount to permit relative motion between the power plant and the vehicle body.

The advantages derived from the invention include the provision, substantially above the front and rear mounts, of an oscillation-engineering based front power plant suspension which simultaneously permits the relative motions of the plant toward the body and the relative motions of the body toward the plant on vehicle collision, without immediately destroying the rear mount. For this purpose, the front mount support is constructed as a deformation element which is capable substantially of absorbing kinetic energy along its entire length in the longitudinal direction of the vehicle. Beside its deformability, the front support is constructed primarily to absorb the static and dynamic bending forces applied by the plant and the impulses of motion.

The structure of the front mount permits separate adjustment, depending on the desired strength and crash behavior. Thus, the energy absorption capacity of the support is made possible almost without alteration of the strength by the introduction of additional deformable elements.

The rear mount is in the form of a thrust and compression bearing, provides for the soft absorption of the bearing forces, acts as a torque support, and allows freedom of motion to the power plant when a collision occurs in the longitudinal direction of the vehicle. For this purpose, the bearing is constructed so that the support arm can penetrate the bearing housing.

Since the front and rear mounts are located along the line of mass of the plant, the third, laterally located mount has only a support function, and, therefore, can be simply constructed. It is connected to the power plant transmission by a support which is relatively soft in the longitudinal direction of the vehicle and readily deformed on frontal impacts, so that it has little effect on the longitudinal supports of the body structure.

These and further objects, features and advantages of the present invention will become more obvious from the following description when taken in connection with the accompanying drawings which show, for purposes of illustration only, several embodiments in accordance with the present invention.

BRIEF DESCRIPTION OF THE DRAWINGS

FIG. 2 is a side view of the power plant and its suspension;

FIG. 3 is a partial plan view of the power plant showing lateral and rear mounts;

FIGS. 11 and 12 are plan views of a support, with an expansion element in the form of a spring member;

FIG. 13 is a plan view of a support, with a tubular expansion element;

FIG. 14 is a plan view of a support, with an expansion element of U-shaped cross section;

DETAILED DESCRIPTION OF THE PREFERRED EMBODIMENTS

Figure 1:
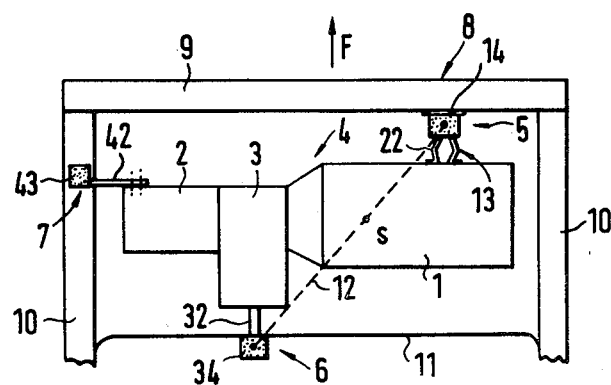
FIG. 1 is a schematic plan view of a vehicle front power plant with a three point suspension.
Figure 4:
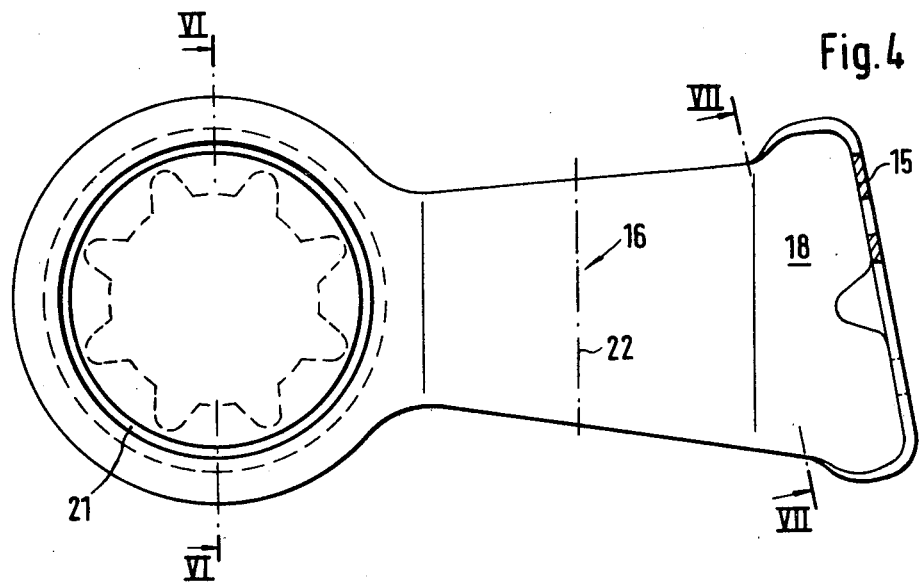
FIG. 4 is a side view of the front mount.
Figure 5:
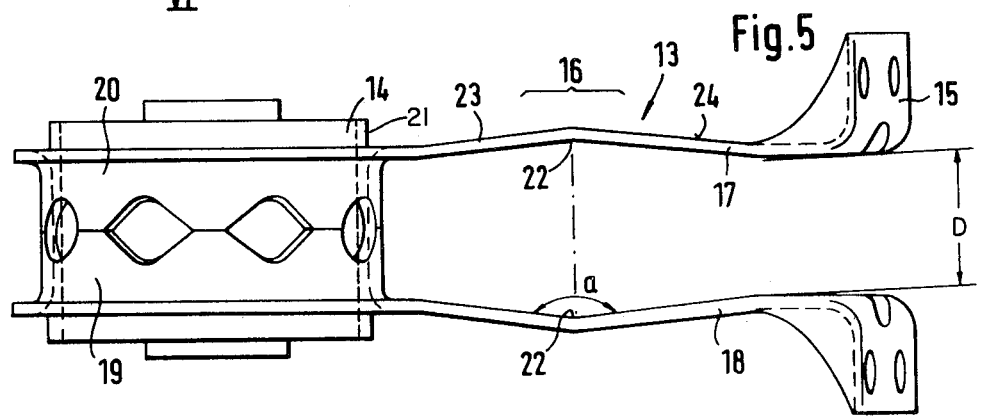
FIG. 5 is a plan view of the front mount of FIG. 4.
Figure 6:
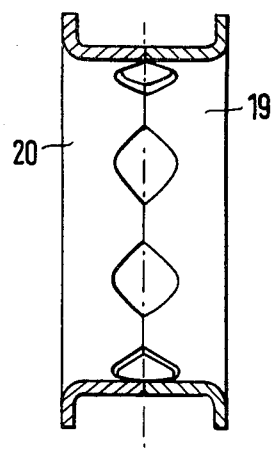
FIG. 6 is a section along line VI—VI in FIG. 4.
Figure 7:
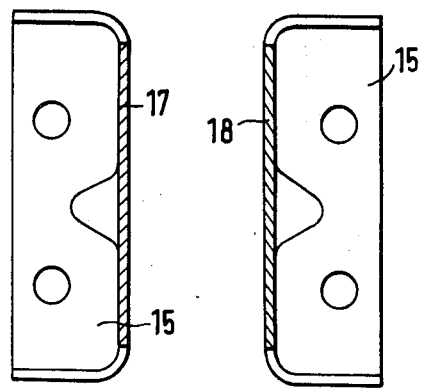
FIG. 7 is a section along line VII—VII in FIG. 4.

A power plant 4 consisting of an engine 1, a transmission 2, and a differential 3, is mounted on a suspension which comprises three mounts 5, 6 and 7 in a front engine compartment, defined by a frame structure 8 formed of parts 9, 10 and 11, of a motor vehicle.

Power plant 4 is mounted transversely relative to a forward driving direction F. Front mount 5 connects engine 1 to transverse frame member 9, rear mount 6 connects differential 3 to rear wall 11, and lateral mount 7 connects transmission 2 to one of the longitudinal frame members 10 of frame structure 8.

Front mount 5 and rear mount 6 are advantageously placed along a connecting line 12 which passes through the center of gravity S of plant 4. Consequently, the third, lateral mount 7 can be simply constructed since it has only a support function.

The three mounts 5, 6 and 7 are elastically constructed to absorb swinging motions, but this fact is not important in respect to the invention, so that further description of this characteristic of the mounts is unnecessary.

Front mount 5 comprises an energy-absorbing, high bending-strength longitudinal support 13 connected to the transverse member 9 of the engine compartment frame structure 8 by an elastic bearing 14. The end of mount 5, opposite bearing 14, is provided with a flange 15 which is attached to engine 1.

Support 13 comprises at least one deformation zone 16 whose structure is determined in consideration of the collision behavior of the vehicle. For this purpose, the deformation zone 16 if formed by at least two members 17 and 18 which extend in the longitudinal direction of the vehicle and are separated by a horizontal distance D. Members 17 and 18 are mounted upright or perpendicular relative to the roadway, and advantageously are formed of pressed sheet metal elements having component holders 19 and 20 for elastic bearing 14. The two members 17 and 18 are connected by bearing 14, which is externally provided with a steel sleeve 21, and is pressed in said holders 19 and 20.

Figure 10:
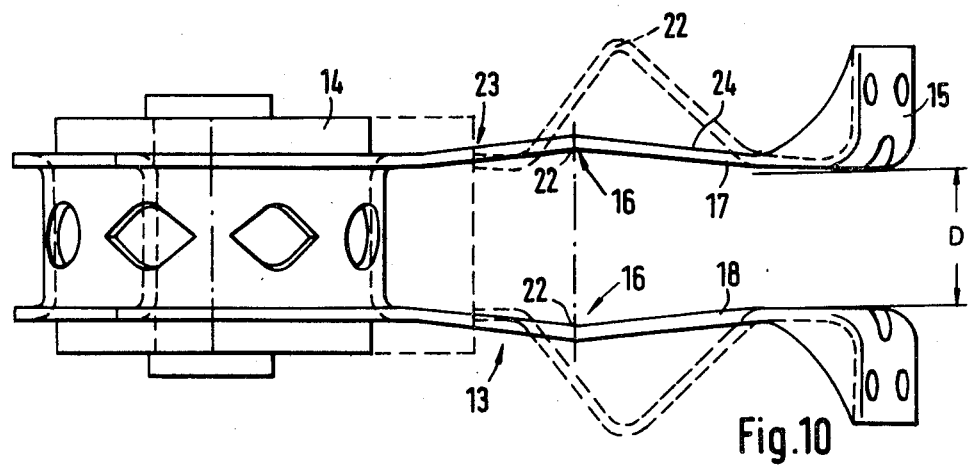
FIG. 10 is a plan view of the FIG. 5 front mount support in a position preceding the deformation (solid lines) and a position subsequent to the deformation (broken lines)
Figure 15:
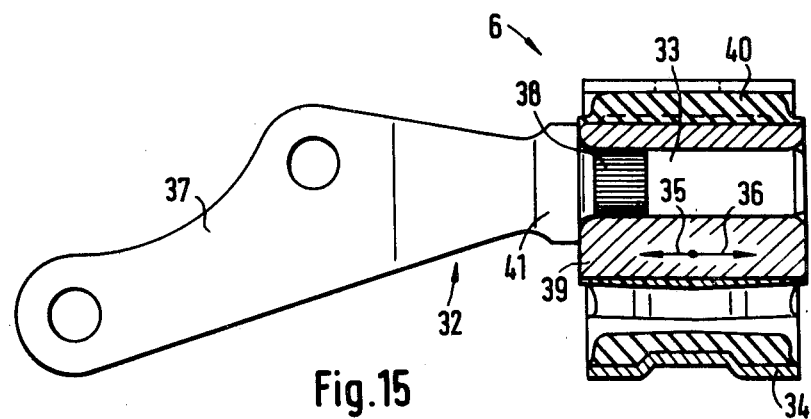
FIG. 15 is a side view of a rear mount.
Figure 16:
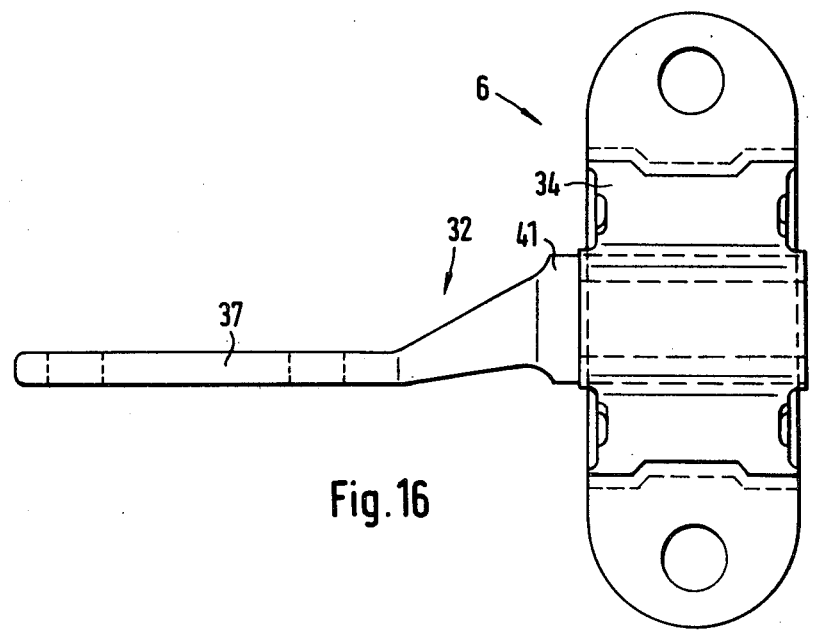
FIG. 16 is a plan view of FIG. 15.

The members 17 and 18 of support 13 consist of sheet metal strips whose deformation zone 16 comprises at least one bend 22 extending in the transverse direction of each member 17, 18. The bend 22 is advantageously located so as to divide each member 17, 18 substantially in the middle into two portions 23 and 24, which form an internal obtuse angle a. FIG. 10 shows, in broken lines, the bending of members 17 and 18 on collision. This indicates that the outward bending of the members is limited.

Figure 8:
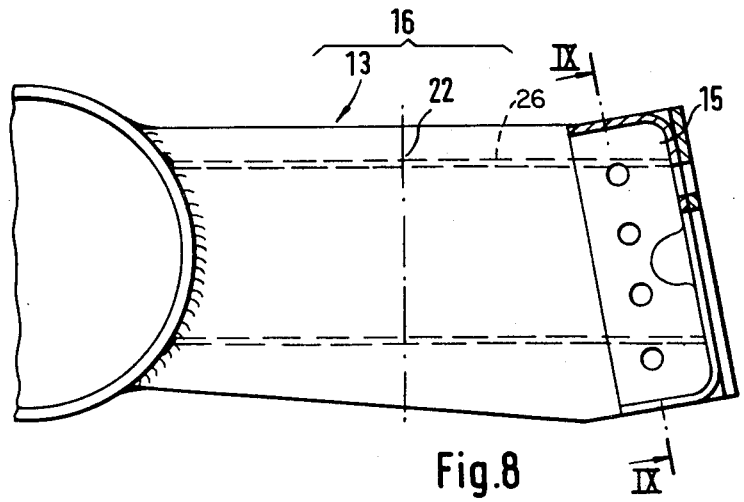
FIG. 8 is a side view of another embodiment of the front mount, comprising a longitudinally mounted tube.
Figure 9:
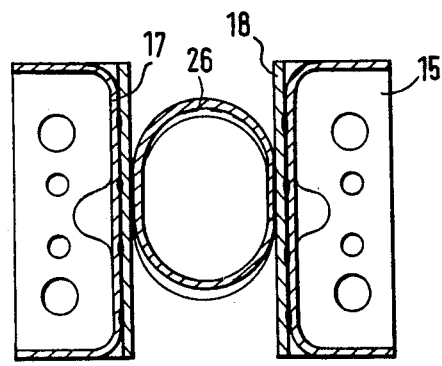
FIG. 9 is a section along line IX—IX in FIG. 8.

In another illustrated embodiment (FIG. 9), to increase the energy absorption, support 13 is provided with an energy-absorbing element 26 which extends longitudinally between the ends of the members 17 and 18 (FIG. 8) and is connected thereat. Element 26 is tubular and may be provided with holes. An embodiment comprising a corrugated tube between members 17 and 18 is also contemplated, although it is not illustrated.

In other embodiments, represented in FIGS. 11, 12, 13 and 14, the energy-absorption by support 13 is increased by a respective expansion element 27, 28, 29 or 30, which extends between members 17 and 18 in the deformation zone 16 at bend 22. In FIGS. 11 and 12, the expanding element is a tension spring 27 or 28. Spring 27 consists of a folded sheet metal element fixed to members 17 and 18 by welding or some other assembling process, while spring 28 is a coil spring whose ends hook into openings in members 17 and 18.

In FIG. 13, a tube 29 of elliptical cross section is vertically oriented between members 17 and 18 and connected to the deformation zone 16 of said members 17 and 18 in the vicinity of its minor diameter.

The embodiment of FIG. 14 utilizes an expansion element 30 of U-shaped cross section whose sides 31 are connected to members 17 and 18. In this embodiment, as illustrated, the middle portion of U-shaped member 30 is oriented toward engine 1, and sides 31 extend from the middle portion toward transverse frame member 9; but it would be possible for member 30 to be placed between members 17 and 18, oriented in a manner turned 180° relative to that shown.

Rear mount 6 includes a bracket 32, which is attached to the differential housing 3 and comprises a fastening portion 37 and a bearing pin 33, and a bearing 34 which is mounted to wall 11. The pin is movable substantially in the direction of arrows 35 and 36 in the bearing 34. Bearing pin 33 is fixed to a steel sleeve 39 by a knurling 38 in a manner precluding relative rotation and axial translation therebetween. The sleeve 39 is connected to a vulcanized-on elastic element 40 of bearing 34. Bearing pin 33 has a pressure abutment 41, adjacent the fastening portion 37 of bracket 32, to prevent the sliding of pin 33 in steel sleeve 39.

Lateral mount 7 comprises a bracket 42 which is attached directly to the housing of transmission 2 and indirectly to the longitudinal member 10 of the frame structure by a resilient bearing 43. Bearing 43 is designed to provide vertical support for the power plant 4, but is relatively soft in the longitudinal direction of the vehicle so that it is readily deformed as a result of frontal impacts. Thus, bearing 43 and mount 5, as a whole, has very little effect on the longitudinal support 10 or other longitudinal supports of the vehicle body structure.

In a head-on collision, power plant 4 is moved by the inertial effect of its own weight in the direction of travel F, and support 13 is permanently deformed as it absorbs energy. Rear mount 6 permits this motion of power plant 4 since bearing pin 33 moves elastically in the longitudinal direction of the vehicle in bearing 34, and the motion can occur in or opposite to the direction of travel. Said rear mount also absorbs motions of the frame relative to the power plant in the direction of travel. It should be appreciated that the length of pin 33 must be coordinated with the extent of foreshortening of front mount 5 which may occur as a result of a collision so as to ensure that a sufficient length of pin 33 remains in bearing 34 to enable it to continue to support the power plant.

From the foregoing, it can be seen that the present invention provides a power plant suspension of a motor vehicle which will absorb power plant related collision produced impulses and prevent there being transmitted from the power plant to the vehicle body without the supporting ability of any of its mounts being destroyed and without a hazardous shifting of the power plant to the vehicle occupant compartment.

While we have shown and described various embodiments in accordance with the present invention, it is understood that the same is not limited thereto, but is susceptible of numerous changes and modifications as known to those skilled in the art, and we, therefore, do not wish to be limited to the details shown and described herein, but intend to cover all such changes and modifications as are encompassed by the scope of the appended claims.

We claim:

1. A suspension for a motor vehicle power plant arranged in an engine compartment defined by a frame structure on mounts located forwardly, rearwardly and laterally of the power plant, wherein one of said mounts comprises an energy-absorbing, high bending-strength longitudinal support that is connected by an elastic bearing to a transverse member of the frame structure forming an external end of the engine compartment, and is connected rigidly to the power plant; and in that at least one other of said mounts comprises a slide bearing means for permitting relative motion between the power plant and the frame structure.

2. The suspension as in claim 1, wherein said longitudinal support comprises at least one deformation zone whose structure is determined in consideration of the collision behavior of the vehicle.

3. The suspension as in claim 1, wherein said longitudinal support comprises at least two members which extend in a longitudinal vehicle direction and are laterally separated from each other, said two members being provided at one end with an interconnecting common holder for the elastic bearing, and at an opposite end thereof with a fastening flange for connecting with the power plant.

4. The suspension as in claim 3, wherein said two members of the longitudinal support are comprised substantially of parallel, vertically oriented, spaced sheet metal strips having a deformation zone formed by a bend extending perpendicularly to the length of the strips, portions of said two members on opposite sides of the bend forming an obtuse angle.

5. The suspension as in claim 4, wherein an expansion element having a definite energy-absorption characteristic is arranged between said two members, said expansion element connecting said two members in the vicinity of said bend.

6. The suspension as in claim 5, wherein the expansion element is tubular.

7. The suspension as in claim 5, wherein the expansion element is in the form of a tension spring.

8. The suspension as in claims 5, wherein the expansion elements consists of a support of U-shaped cross section whose sides are fixed at the inside of said two members.

9. The suspension as in claim 4, wherein an energy-absorbing element extends lengthwise between the ends of said two members and is connected thereat.

10. The suspension as in claim 9, wherein the energy-absorbing element is tubular.

11. The suspension as in claim 9 or 10, wherein said energy-absorbing element is a noncircular tube.

12. The suspension as in claim 3, wherein said elastic bearing is retained in the common holder by a press fit.

13. The suspension as in claim 1, wherein said other mount comprises a bracket having a fastening portion and a bearing pin, and a bearing attached to a transverse wall of the frame structure forming an interior end wall of the engine compartment, said slide bearing being formed by said bearing pin being received in said bearing in a manner enabling elastic movement thereof in longitudinal vehicle directions.

14. The suspension as in claim 13, wherein said other mount further comprises a rigid sleeve and wherein said bearing pin is secured against rotation and longiutdinal shifting relative to said rigid sleeve by a knurling, the rigid sleeve being connected to a housing of the transverse wall attached bearing by a vulcanized-on elastic element of the bearing.

15. The suspension as in claim 13 or 14, wherein the bearing pin is provided with a pressure abutment in contact with a face of the bearing and delimits the pin relative to the fastening portion of the bracket.

16. The suspension according to claim 1 or 3 or 4 or 13 or 14, wherein said mounts support said power plant transversely relative to a forward direction of vehicle travel, and said engine compartment is at the front of a motor vehicle, said transverse member being at the front of the engine compartment relative to said forward direction of vehicle travel.

17. The suspension as in claim 16, wherein the slide bearing is elastically constructed, so that resilient motion of the power plant, in a rearward direction of vehicle travel, is limited, on collision, by an end wall of the frame structure at a point opposite a differential of the power plant.

18. The suspension as in claim 16, wherein the one of said mounts that is located laterally of the power plant comprises a bracket attached at one end to a frontal part of a transmission of the power plant carried at an opposite end by a longitudinally resilient bearing on a longitudinal member of the frame structure.

19. The suspension as in claim 2, wherein said longitudinal support comprises at least two members which extend in a longitudinal vehicle direction and are laterally separated from each other, said two members being provided at one end with an interconnecting common holder for the elastic bearing, and at an opposite end thereof with a fastening flange for connecting with the power plant.

20. The suspension as in claim 3 or 4, wherein said other mount comprises a bracket having a fastening portion and a bearing pin, and a bearing attached to a transverse wall of the frame structure forming an interior end wall of the engine compartment, said slide bearing being formed by said bearing pin being received in said bearing in a manner enabling elastic movement thereof in longitudinal vehicle directions.

21. The suspension according to claim 1, wherein said mounts support said power plant transversely relative to a forward direction of vehicle travel, and said engine compartment is at the front of a motor vehicle, said transverse member being at the front of the engine compartment relative to said forward direction of vehicle travel, and further wherein said power plant comprises an engine connected to a transmission by a differential, said energy-absorbing longitudinal support connecting the transverse member of the frame structure with the engine, said slide bearing connecting the differential with a transverse wall of the frame structure defining a rear end of the engine compartment, and the transmission being connected to a longitudinal member of the frame structure in a vertically supportive and longitudinally resilient manner.

22. The suspension according to claim 21, wherein the energy-absorbing longitudinal support is positionally arranged relative to said slide bearing in a manner such that a line connecting the longitudinal support and slide bearing passes through the center of gravity of the power plant.

* * * * *